(12) United States Patent
Nakayasu (10) Patent No.: US 7,338,073 B2
(45) Date of Patent: Mar. 4, 2008

(54) INFLATOR

(75) Inventor: Masayuki Nakayasu, Hyogo (JP)

(73) Assignee: Daicel Chemical Industries, Ltd., Osaka (JP)

( * ) Notice: Subject to any disclaimer, the term of this patent is extended or adjusted under 35 U.S.C. 154(b) by 185 days.

(21) Appl. No.: 11/204,155

(22) Filed: Aug. 16, 2005

(65) Prior Publication Data

US 2006/0076762 A1 Apr. 13, 2006

Related U.S. Application Data (60) Provisional application No. 60/602,866, filed on Aug. 20, 2004.

(30) Foreign Application Priority Data

Aug. 18, 2004 (JP) .............................. 2004-238031

(51) Int. Cl.
*B60R 21/26* (2006.01)
(52) U.S. Cl. ...................... 280/737; 741/742
(58) Field of Classification Search ................ 280/737, 280/740, 741, 742
See application file for complete search history.

(56) References Cited

U.S. PATENT DOCUMENTS

| | | | | |
|---|---|---|---|---|
| 3,948,540 A * | 4/1976 | Meacham | ................... | 280/735 |
| 3,966,226 A * | 6/1976 | Roth | ........................... | 280/737 |
| 3,968,980 A * | 7/1976 | Hay | ............................ | 280/734 |
| 5,273,312 A * | 12/1993 | Coultas et al. | ............... | 280/737 |
| 5,462,307 A * | 10/1995 | Webber et al. | .............. | 280/737 |
| 5,582,426 A * | 12/1996 | O'Loughlin et al. | ........ | 280/741 |
| 5,711,547 A * | 1/1998 | Blumenthal et al. | ........ | 280/737 |
| 5,788,275 A * | 8/1998 | Butt et al. | ................... | 280/737 |
| 6,068,292 A * | 5/2000 | Renz | ........................... | 280/737 |
| 6,234,522 B1 * | 5/2001 | Albrecht et al. | ............ | 280/737 |
| 6,289,820 B1 * | 9/2001 | Anacker et al. | ............ | 102/530 |
| 6,488,310 B1 * | 12/2002 | Ryobo et al. | ............... | 280/736 |
| 6,499,764 B2 * | 12/2002 | Anacker et al. | ............ | 280/737 |
| 6,554,315 B2 | 4/2003 | Freesmeier | | |
| 6,676,157 B2 * | 1/2004 | Nanbu | ........................ | 280/736 |
| 6,755,439 B2 * | 6/2004 | Nanbu | ........................ | 280/737 |
| 6,814,371 B2 * | 11/2004 | Welz | .......................... | 280/736 |
| 2002/0130501 A1 | 9/2002 | Nanbu | | |
| 2005/0035581 A1 * | 2/2005 | Katsuda et al. | ............. | 280/741 |
| 2006/0043715 A1 * | 3/2006 | Green et al. | ................ | 208/737 |
| 2006/0103123 A1 * | 5/2006 | Myers | ........................ | 280/736 |

FOREIGN PATENT DOCUMENTS

| | | |
|---|---|---|
| EP | 0604001 A1 | 6/1994 |
| EP | 1323595 A1 | 7/2003 |
| JP | 8-268211 A | 10/1996 |
| JP | 3562020 B2 | 9/2004 |

* cited by examiner

*Primary Examiner*—Paul N. Dickson
*Assistant Examiner*—Toan C. To
(74) *Attorney, Agent, or Firm*—Birch, Stewart, Kolasch & Birch, LLP (57) ABSTRACT

An inflator suitable for use in a curtain air bag system or the like is provided. A first passage 37 linking an ignition means chamber 30 and the interior of an inflator housing 20 is blocked by a first rupturable plate 38. The first rupturable plate 38 is formed integrally with a rod-form member 24. When an igniter 36 is activated, the first rupturable plate 38 is ruptured, thereby pushing the rod-form member 24 such that an arrowhead 24c of the rod-form member 24 ruptures a second rupturable plate 48. Pressurized gas is then discharged through gas discharge holes 46 to inflate the air bag.

12 Claims, 5 Drawing Sheets

INFLATOR

This nonprovisional application claims priority under 35 U.S.C. § 119(e) on U.S. Provisional Application No. 60/602,866 filed on Aug. 20, 2004 and under 35 U.S.C. § 119(a) on Patent Application No. 2004-238031 filed in Japan on Aug. 18, 2004, which are herein incorporated by reference.

BACKGROUND OF THE INVENTION

1. Field of the Invention

The present invention relates to an inflator used in an air bag system.

2. Description of Related Art

Some inflators used in air bag systems for protecting passengers during a collision use only pressurized gas as an inflation gas source of an air bag. In this type of inflator, it is preferable, in terms of workability when attaching the air bag to a gas outlet of the inflator, that the respective positions of the gas outlet and igniter be removed from each other so that a lead wire extending from the igniter does not cause an obstruction.

U.S. Pat. No. 6,554,315 (see FIG. 2 in particular) discloses an inflator in which the respective positions of the gas outlet and igniter are removed apart from each other. Gas for inflating the bag is sealed inside a reservoir 18, and the gas outlet from the reservoir 18 is blocked by a rupturable plate 74. A rod 76 is disposed in a position facing the rupturable plate 74. A propellant charge 64 is burned when a squib 58 is activated, causing an increase in pressure which ruptures a rupturable plate 40. Simultaneously, the rod 76 is pushed, thereby rupturing the rupturable plate 74. Thus the gas in the reservoir 18 is discharged to the outside through a discharging hole 92. The bag is connected to a gas generator via a manifold 8.

In the inflator of U.S. Pat. No. 6,554,315, the igniter and gas discharge hole are positioned at opposite ends of the axial direction of a housing, and therefore a lead wire extending from the igniter does not cause an obstruction when attaching the air bag. As a result, attachment can be performed easily.

In the inflator of U.S. Pat. No. 6,554,315, a mechanism which warms the pressurized gas is activated by ignition of the propellant charge 64, and hence the gas that is discharged into the bag is likely to be cooled by adiabatic expansion. As a result, it is difficult to secure sufficient pressure in the bag and a sufficiently long inflation period. These are points which require improvement.

SUMMARY OF THE INVENTION

An aspect of the present invention is to provide an inflator, comprising:
- a cylindrical inflator housing for storing a pressurized gas therein;
- an ignition means chamber housing defining therein an ignition means chamber and including therein an igniter, the ignition means chamber housing being connected to one end of the cylindrical inflator housing such that the ignition means chamber housing and the cylindrical inflator housing communicate with each other through a first through-hole;
- a first rupturable plate sealing the first through-hole before activation of the inflator, the first rupturable plate being ruptured by the igniter;
- a diffuser portion provided with a gas discharge hole and being connected to the other end of the cylindrical inflator housing such that the diffuser portion and the cylindrical inflator housing communicate with each other through a second through-hole;
- a second rupturable plate sealing the second through-hole before activation of the inflator; and
- means provided within the cylindrical inflator housing and guiding fracture energy from the first rupturable plate to the second rupturable plate such that the first rupturable plate ruptured initially and the second rupturable plate is ruptured latterly.

In other words, an aspect of the present invention is to provide an inflator which can keep the temperature of gas that is discharged into an air bag as low as possible, and is therefore particularly suitable for use in a side or curtain air bag system, in which the bag should remain inflated for a comparatively long time (approximately several seconds or more).

As means for achieving this object, the invention provides an inflator comprising a cylindrical inflator housing, an ignition means chamber connected to one end of the cylindrical inflator housing, and a diffuser portion connected to the other end of the cylindrical inflator housing,
- wherein the ignition means chamber includes an igniter but does not comprise through holes to the outside, and the ignition means chamber is blocked from the interior of the inflator housing by a first rupturable plate,
- the diffuser portion alone is provided with a gas discharge hole, and the diffuser portion is blocked from the interior of the inflator housing by a second rupturable plate,
- a pressurized gas is charged at high pressure into the interior of the cylindrical inflator housing, and
- means for guiding fracture energy from the first rupturable plate to the second rupturable plate to rupture the second rupturable plate are provided in the cylindrical inflator housing, and hence when the igniter housed in the ignition means chamber is activated, the first rupturable plate is ruptured initially, and the second rupturable plate is ruptured latterly.

The interior of the cylindrical inflator housing is maintained in an airtight state by the inflator housing and the two rupturable plates. An inert gas such as helium (970 m/sec), neon (435 m/sec), or argon (319 m/sec), or a gas such as nitrogen gas (337 m/sec), argon (337 m/sec), or carbon dioxide gas is charged at high pressure into the interior of the inflator housing. The sound velocity values are maximum values at 0° C., 1013.25 hPa.

The ignition means chamber does not comprise through holes to the outside, and only contacts the interior of the inflator housing via the first rupturable plate. Hence, when the first rupturable plate is ruptured following activation of the igniter, the ignition means chamber communicates only with the interior of the inflator housing.

The diffuser portion comprises a gas discharge hole, and hence only the diffuser portion communicates with the outside air via this gas discharge hole prior to an operation. Following activation of the igniter, the second rupturable plate is ruptured, and hence the diffuser portion communicates with the interior of the inflator housing.

The means for guiding fracture energy is means for guiding the fracture energy to the second rupturable plate in order to rupture the second rupturable plate after the first rupturable plate is ruptured by fracture energy generated through activation of the igniter in the ignition means chamber.

The actions of the igniter and the means for guiding fracture energy ruptures the first rupturable plate and then the second rupturable plate in sequence. As a result, the pressurized gas in the inflator housing is discharged in a unidirectional flow through the gas discharge hole in the diffuser portion to inflate the air bag.

In the present invention, the igniter and diffuser portion (gas discharge hole) are positioned on opposite ends of the inflator housing, and hence when the air bag is attached to the diffuser portion, a lead wire extending from the igniter does not cause an obstruction.

In the inflator of the present invention, the means for guiding fracture energy may comprise a rod-form member, one end of the rod-form member may be disposed in contact with the first rupturable plate or in the vicinity of the first rupturable plate, and the other end of the rod-form member may be disposed in contact with the second rupturable plate or in the vicinity of the second rupturable plate. Note that the end portion of the rod-form member that is disposed in the vicinity of the second rupturable plate or in contact with the second rupturable plate may be formed in the shape of an arrowhead.

When the first rupturable plate ruptures upon reception of the energy generated by activation of the igniter, the rod-form portion, which receives great pressure at one end portion, moves rapidly in the axial direction so that the other end portion impinges on and ruptures the second rupturable plate, thereby opening a discharge path to the gas discharge hole.

The other end of the rod-form member serving as the means for guiding fracture energy may be supported by a support member disposed on the second rupturable plate side such that the central portion of the second rupturable plate coincides with the center of the other end portion of the rod-form member. In so doing, the other end portion of the rod-form member impinges on the second rupturable plate reliably.

The end portion of the rod-form member, which serves as the means for guiding fracture energy, on the first rupturable plate side may be formed in a disc shape having an approximately identical size to the first rupturable plate, for example, so that this end portion of the rod-form member receives pressure more easily.

After rupturing the second rupturable plate, the rod-form member serving as the means for guiding fracture energy may continue to advance and thereby impinge on the bottom face of the diffuser portion. In this case, the bottom face of the diffuser portion may be formed slightly more thickly, or a stopper portion (a disc-form protrusion, for example) may be provided on the rod-form member in a position near the second rupturable plate so that after the second rupturable plate ruptures, the stopper portion collides with the aforementioned support member and is thus prevented from advancing.

In the inflator of the present invention, one end of the rod-form member serving as the means for guiding fracture energy may be joined to the first rupturable plate.

In so doing, the first rupturable plate and rod-form member can be fixed simultaneously, and positioning of the rod-form member can be performed easily. By fixing the first rupturable plate and second rupturable plate in coaxial positions, the tip end of the other end portion of the rod-form member matches the center of the second rupturable plate.

In the inflator of the present invention, the means for guiding fracture energy may comprise a tube member, one end of the tube member may be disposed in contact with the first rupturable plate or in the vicinity of the first rupturable plate, and the other end of the tube member may be disposed in contact with the second rupturable plate or in the vicinity of the second rupturable plate.

When the first rupturable plate ruptures upon reception of energy generated through activation of the igniter, the resultant fracture energy advances to the second rupturable plate through the interior of the tube member, and then impinges on and ruptures the second rupturable plate, thereby opening a discharge path to the gas discharge hole.

The opening diameter of the tube member on the first rupturable plate side is preferably approximately equal to or slightly greater than the diameter of the first rupturable plate so that all of the fracture energy which advances through the ruptured first rupturable plate can be introduced into the tube member.

When a tube member is used as the means for guiding fracture energy, the tube member may be supported on the second rupturable plate side by a support member similarly to the rod-form member described above.

In the inflator of the present invention, the tube member serving as the means for guiding fracture energy may decrease in diameter from the first rupturable plate side to the second rupturable plate side.

When the diameter of the tube member on the first rupturable plate side is set to be approximately equal to or slightly greater than the diameter of the first rupturable plate as described above, and the diameter of the tube member on the second rupturable plate side is set to be smaller, fracture energy is more likely to be concentrated in the central portion of the second rupturable plate such that the second rupturable plate ruptures more easily. There are no limitations on the degree and state of variation in the diameter, but the diameter is preferably set to become steadily smaller from the first rupturable plate side to the second rupturable plate side.

In the present invention, the means for guiding fracture energy preferably comprise a combination of the tube member and an projectile member, and the projectile member is preferably inserted into the tube member on the second rupturable plate side.

The fracture energy passing through the tube member pushes against the arrowhead-projectile member such that the pushed projectile member impinges rapidly on the second rupturable plate, thereby rupturing the second rupturable plate. As a result, a discharge path to the gas discharge hole is opened.

In the inflator of the present invention, a stopper may be provided on an end portion of the tube member on the second rupturable plate side to prevent the projectile member from flying out of the tube member.

By providing this stopper, damage to the diffuser portion and blockages of the gas discharge hole, occurring when the projectile flies out of the tube, are prevented.

In the inflator of the present invention, a support member for supporting the means for guiding fracture energy may be disposed in the cylindrical inflator housing on the second rupturable plate side.

The inflator of the present invention is particularly suitable for use as an inflator for a side air bag or an inflator for a curtain air bag, but may be applied to other known air bags.

In the inflator of the present invention, the igniter and gas discharge hole are positioned at opposite ends of the axial direction of the housing, and hence the lead wire extending from the igniter does not cause an obstruction when attaching an air bag. As a result, the air bag can be attached easily. Moreover, with the inflator of the present invention, sufficient pressure in the air bag and a sufficiently long inflation period can be secured during an operation.

DETAILED DESCRIPTION OF THE INVENTION

Embodiments of the present invention will now be described using the drawings. In the following, the terms "axial direction" and "radial direction" denote directions based on the inflator housing.

(1) First Embodiment

Figure 1:
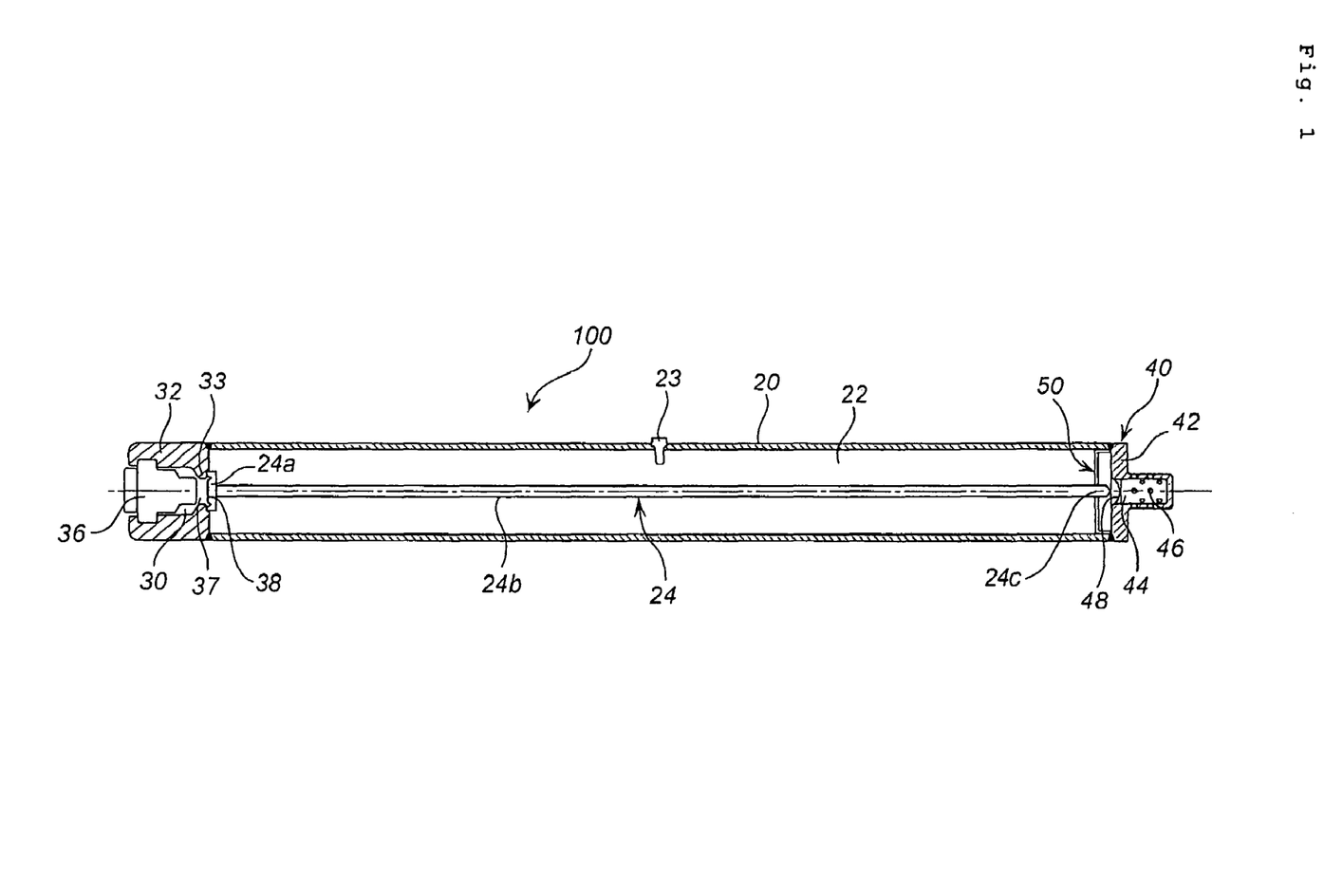
FIG. 1 is a sectional view of an inflator of the present invention in the axial direction thereof.

A first embodiment will be described using FIG. 1. FIG. 1 is a sectional view of an inflator in the axial direction thereof.

An inflator 100 comprises a cylindrical inflator housing 20 made of a metal having a high degree of pressure resistance, such as steel, an ignition means chamber 30 connected to one end of the inflator housing 20, and a diffuser portion 40 connected to the other end. The ignition means chamber 30 and diffuser portion 40 may be made from stainless steel, aluminum, or any similar material.

In FIG. 1, the inflator housing 20, ignition means chamber 30, and diffuser portion 40 are formed separately, but may be formed as a single member (forming the entire outer shell with the inflator housing, for example) and defined by partition walls and rupturable plates.

An interior space 22 of the inflator housing 20 is maintained in an airtight state and charged with a high-pressure (approximately 35,000 to 70,000 kPa) gas such as argon, helium, or nitrogen. The sound velocity of the pressurized gas at 0° C., 1013.25 hPa is preferably not less than 400 m/sec.

The inflator housing 20 may employ a known gas cylinder. In the inflator 100 in FIG. 1, the ignition means chamber 30 is connected to one end of the inflator housing 20, and the diffuser portion 40 is connected to the other end. Rupturable plates are provided so that the interior of the inflator housing 20 is maintained in an airtight state, whereupon the pressurized gas is charged through a gap provided around a sealing pin 23 which is fitted into a small hole. The inflator housing 20 is then welded at the sealing pin 23 part.

The outer shell of the ignition means chamber 30 is formed by an ignition means chamber housing 32. An igniter 36 comprising an ignition charge is accommodated in and fixed to the interior of the ignition means chamber housing 32, and the ignition means chamber 30 does not communicate with the exterior of the inflator 100. The igniter 36 is connected to a power source (an automobile battery) via a connector and a lead wire (extending in the axial direction of the inflator housing 20 in FIG. 1).

A first rupturable plate 38 made of stainless steel is provided on a first passage 37 between the inflator housing 20 (interior space 22) and ignition means chamber 30. The first passage 37 is blocked by the first rupturable plate 38, and therefore the interior of the ignition means chamber 30 is at normal pressure. The peripheral edge portion of the first rupturable plate 38 is fixed by welding to a part 33 of the inner surface of the ignition means chamber housing 32 which protrudes in the radial direction.

The outer shell of the diffuser portion 40 is formed by a diffuser housing 42. A second passage 44 is provided in the interior of the diffuser portion 40, and a plurality of gas discharge holes 46 are provided in the diffuser housing 42 for ejecting pressurized gas to the outside. The plurality of gas discharge holes 46 are provided evenly in the radial direction.

A second rupturable plate 48 made of stainless steel is provided between the inflator housing 20 (interior space 22) and second passage 44. The second passage 44 is blocked by the second rupturable plate 48, and therefore the interior of the diffuser portion 40 is at ambient pressure. The peripheral edge portion of the second rupturable plate 48 is fixed by welding to the diffuser housing 42.

As shown in FIG. 1, the inflator housing 20 is connected respectively to the ignition means chamber 30 and the diffuser 40 by welding.

A rod-form member 24 is provided in the interior of the inflator housing 20 as means for guiding fracture energy from the first rupturable plate 38 to the second rupturable plate 48 to rupture the second rupturable plate 48.

The rod-form portion 24 comprises a disc portion 24a, a shaft portion 24b, and an arrowhead 24c, the disc portion 24a being formed integrally with the first rupturable plate 38. In this case, the disc portion 24a may function as the first rupturable plate 38. The arrowhead 24c may contact the second rupturable plate 48 or be positioned at a distance therefrom.

By integrating the disc portion 24a and first rupturable plate 38 in this manner, the rod-form member 24 can be fixed by fixing the first rupturable plate 38, and simultaneously the rod-form member 24 (arrowhead 24c) can be positioned.

A guide member 50 for holding the rod-form member 24 in a predetermined position is provided in the inflator housing 20 in a position near the diffuser portion 40.

Figure 5:
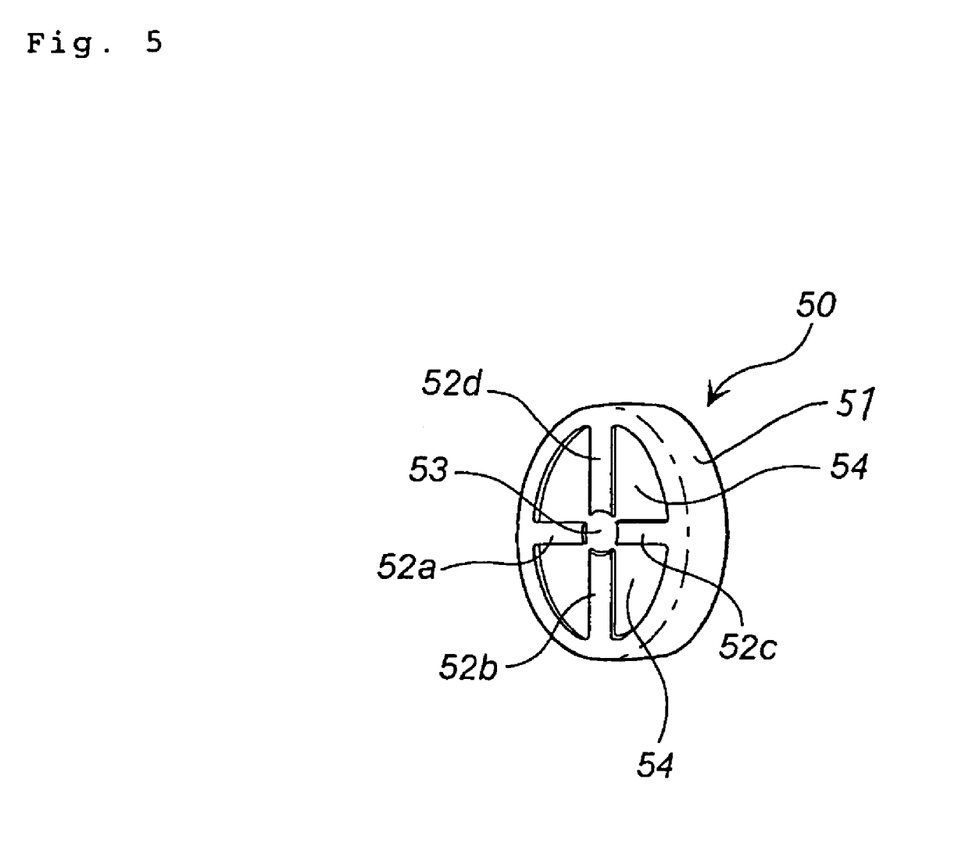
FIG. 5 is a perspective view of a support member serving as a component of the inflator of the present invention.

As shown in FIG. 5, the guide member 50 comprises an annular portion 51 and four support portions 52a to 52d extending toward the center from the annular portion 51. The tip end portion (arrowhead 24c) of the rod-form member 24 is inserted into a space 53 surrounded by the four support portions 52a to 52d, and supported thereby. By positioning the arrowhead 24c within this substantially circular space 53, the arrowhead 24c can be caused to face the second rupturable plate 48 directly. Further, four fan-shaped spaces 54 formed by the support portions adjacent thereto and the annular portion 51 serve as pressurized gas discharge paths.

Note that in order to prevent the rod-form member 24 from impinging on the bottom face of the diffuser portion 40, a disc extending in the radial direction may be attached to a predetermined position of the rod-form member 24 (a position from which the second rupturable plate 48 can be ruptured and impingement on the bottom face of the diffuser portion 40 can be prevented). This disc is set to be larger than the substantially circular space 53 but not large enough to block the fan-shaped spaces 54.

Next, an operation of the inflator 100 shown in FIG. 1 will be described. When the first rupturable plate 38 is ruptured upon activation of the igniter 36, the resultant fracture energy (pressure generated principally by combustion of the ignition charge) pushes with a pressure against the disc portion 24a of the rod-form member 24. In FIG. 1, the disc portion 24a is formed integrally with the first rupturable plate 38, and hence the fracture energy pushes the rod-form member 24 with a powerful force in the axial direction.

As a result, the arrowhead 24c impinges on the second rupturable plate 48, thereby rupturing the second rupturable plate 48. The action of the guide member 50 at this time ensures that the arrowhead 24c impinges reliably on the second rupturable plate 48.

The pressurized gas charged at high pressure into the interior space 22 then flows into the diffuser portion 40 and is discharged through the gas discharge holes 46 to inflate the air bag.

The igniter 36 is provided at only one end portion of the inflator 100, and the gas discharge holes 46 are provided on the opposite side of the igniter 36. Therefore, when attaching an air bag to the gas discharge holes 46, the lead wire connecting the igniter 36 to the power source (battery) does not obstruct the operation.

Furthermore, the inflator 100 generates no particular heat during an operation, and hence the temperature of the pressurized gas can be kept low. As a result, pressure reductions due to volume shrinkage in the gas that is discharged into the air bag can be suppressed, and sufficient pressure can be maintained to ensure passenger safety (more specifically, the air bag can be maintained in an inflated state for five seconds or more).

(2) Second Embodiment

Figure 2:
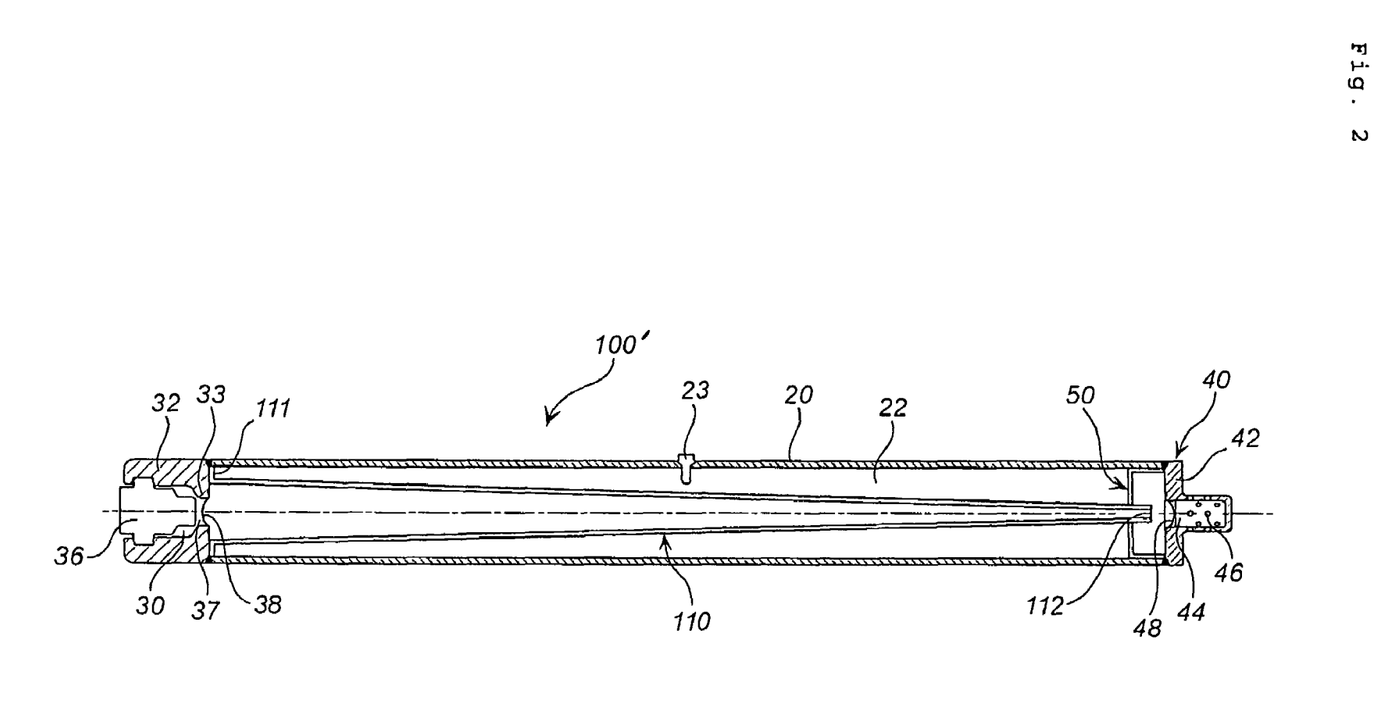
FIG. 2 is a sectional view of the inflator of the present invention in the axial direction thereof.

A second embodiment will be described using FIG. 2. FIG. 2 is a sectional view of an inflator in the axial direction thereof. An inflator 100' in FIG. 2 differs from the inflator 100 in FIG. 1 in the means for guiding fracture energy that are used to rupture the second rupturable plate 48. Only this difference will be described.

In FIG. 2, a tube member 110 is used as the means for guiding fracture energy. There are no holes in the side face of the tube member 110 itself, but pressurized gas also exists in the interior of the tube member 110, and hence the interior of the tube member 110 is maintained at an equal pressure to the interior of the inflator housing 20. Since the pressure inside and outside of the tube member 110 is equal, the thickness of the tube member 110 can be reduced.

The inner diameter of the tube member 110 on the ignition means chamber 30 side is set to be greater than the outer diameter of the first rupturable plate 38 (including the part that is welded to the ignition means chamber housing 32), and the inner diameter of the tube member 110 on the diffuser portion 40 side is set to be smaller than the outer diameter of the second rupturable plate 48 (excluding the part that is welded to the diffuser housing 42).

A flange portion 111 is provided on the ignition means chamber 30 side of the tube member 110, and the flange portion 111 abuts against the ignition means chamber housing 32 and the inner wall surface of the inflator housing 20. The outer diameter of the tube member 110 including the flange portion 111 is equal to the inner diameter of the inflator housing 20, and hence when the tube member 110 is inserted and pressed into the inflator housing 20, positioning thereof is achieved simultaneously.

An opening portion 112 on the diffuser portion 40 side of the tube member 110 is set such that a gap is formed between it and the second rupturable plate 48. This gap serves as a discharge path to the gas discharge holes 46 for the pressurized gas inside the inflator housing 20.

Next, an operation of the inflator 100' shown in FIG. 2 will be described. When the first rupturable plate 38 is ruptured upon activation of the igniter 36, all of the resultant fracture energy (pressure generated principally by combustion of the ignition charge) flows into the tube member 110, and is discharged through the outlet on the opposite side to rupture the second rupturable plate 48. Due to the action of the guide member 50 at this time, the fracture energy impinges on the second rupturable plate 48 reliably.

The pressurized gas charged at high pressure into the interior space 22 then flows into the diffuser portion 40 and is discharged through the gas discharge holes 46 to inflate the air bag.

The igniter 36 is provided at only one end portion of the inflator 100', and the gas discharge holes 46 are provided on the opposite side of the igniter 36. Therefore, when attaching the air bag to the gas discharge holes 46, the lead wire connecting the igniter 36 to the power source (battery) does not obstruct the operation.

Furthermore, the inflator 100' generates no particular heat during an operation, and hence the temperature of the pressurized gas can be kept low. As a result, pressure reductions due to volume shrinkage in the gas that is discharged into the air bag can be suppressed, and sufficient pressure can be maintained to ensure passenger safety (more specifically, the air bag can be maintained in an inflated state for five seconds or more).

(3) Third Embodiment

Figure 3:
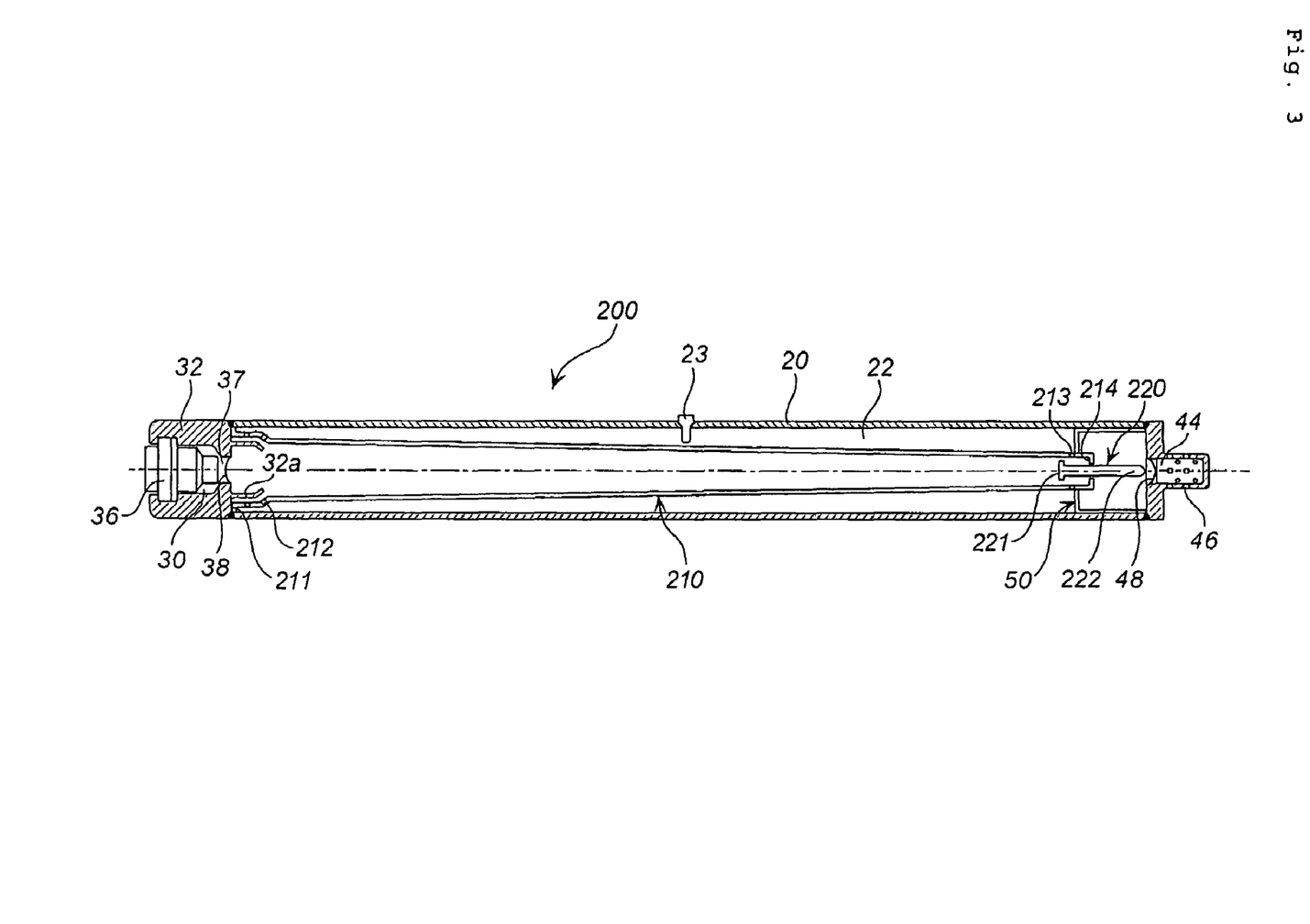
FIG. 3 is a sectional view of the inflator of the present invention in the axial direction thereof.

A third embodiment will be described using FIG. 3. FIG. 3 is a sectional view of an inflator in the axial direction thereof. An inflator 200 in FIG. 3 differs from the inflator 100 in FIG. 1 in the means for guiding fracture energy that are used to rupture the second rupturable plate 48. Only this difference will be described.

In FIG. 3, a combination of a tube member 210 and an projectile member 220 is used as the means for guiding fracture energy.

The inner diameter of the tube member 210 on the ignition means chamber 30 side is set to be greater than the outer diameter of the first rupturable plate 38 (including the part that is welded to the ignition means chamber housing 32).

A flange portion 211 is provided on the ignition means chamber 30 side of the tube member 210, and the flange portion 211 abuts against the ignition means chamber housing 32 and the inner wall surface of the inflator housing 20. The outer diameter of the tube member 210 including the flange portion 211 is equal to the inner diameter of the inflator housing 20, and hence when the tube member 210 is inserted and pressed into the inflator housing 20, positioning thereof is achieved simultaneously.

A plurality of vent holes 212 are provided on the ignition means chamber 30 side of the tube member 210, and a plurality of vent holes 213 are provided on the diffuser portion 40 side. Therefore, pressurized gas also exists in the tube member 210, and hence the inside of the tube member 210 is maintained at an equal pressure to the inside of inflator housing 20.

During an operation of the inflator 200, the vent holes 213 function to discharge the pressurized gas existing in the space surrounded by the tube member 210, projectile member 220, and an inward flange 214 out of the tube member 210 such that the pressurized gas does not provide resistance to the movement of the projectile member 220. For this purpose, the vent holes 213 are preferably formed in the end portion of the tube member 210 as close as possible to the second rupturable plate 48.

A cylindrical protrusion 32a is formed to protrude from the ignition means chamber housing 32, and serves to prevent the fracture energy generated upon activation of the igniter 36 from escaping through the plurality of vent holes 212.

The projectile member 220 is inserted into the diffuser portion 40 side of the tube member 210. A part of the projectile member 220 is positioned within the tube member 210, and the remainder is positioned outside of the tube member 210. A gap is provided between the projectile member 220 and second rupturable plate 48, but the projectile member 220 may abut against the second rupturable plate 48.

The projectile member 220 comprises a disc portion 221 and an arrowhead 222 provided upright from the disc portion 221. A combination of the disc portion 221 and the inward flange 214 provided at the opening portion of the tube member 210 serves as a stopper preventing the entire projectile member 220 from flying out of the tube member 210.

Next, an operation of the inflator 200 shown in FIG. 3 will be described. When the first rupturable plate 38 is ruptured upon activation of the igniter 36, all of the resultant fracture energy (pressure generated principally by combustion of the ignition charge) flows into the tube member 210 and presses against the projectile member 220 positioned on the opposite end portion.

The arrowhead 222 of the pushed projectile member 220 impinges on and ruptures the second rupturable plate 48. Due to the action of the guide member 50 at this time, the fracture energy impinges on the second rupturable plate 48 reliably. Moreover, since the disc portion 221 of the projectile member 220 impinges on the inside flange 214, the projectile member 220 is prevented from flying out of the tube member 210 and blocking the gas discharge path and so on.

The pressurized gas charged at high pressure into the interior space 22 then flows into the diffuser portion 40 and is discharged through the gas discharge holes 46 to inflate the air bag.

The igniter 36 is provided at only one end portion of the inflator 200, and the gas discharge holes 46 are provided on the opposite side of the igniter 36. Therefore, when attaching the air bag to the gas discharge holes 46, the lead wire connecting the igniter 36 to the power source (battery) does not obstruct the operation.

Furthermore, the inflator 200 generates no particular heat during an operation, and hence the temperature of the pressurized gas can be kept low. As a result, pressure reductions due to volume shrinkage in the gas that is discharged into the air bag can be suppressed, and sufficient pressure can be maintained to ensure passenger safety (more specifically, the air bag can be maintained in an inflated state for five seconds or more).

(4) Fourth Embodiment

Figure 4:
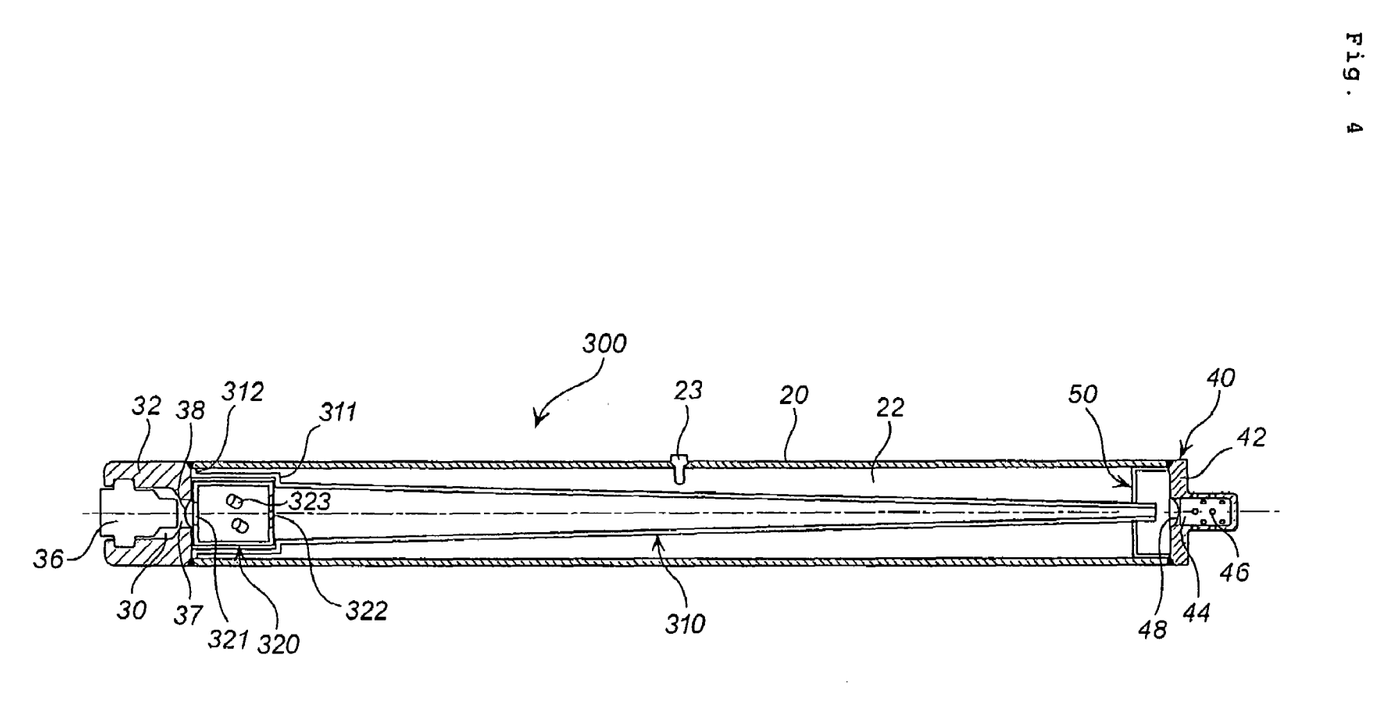
FIG. 4 is a sectional view of the inflator of the present invention in the axial direction thereof.

A fourth embodiment will be described using FIG. 4. FIG. 4 is a sectional view of an inflator in the axial direction thereof. An inflator 300 in FIG. 4 differs from the inflator 100' in FIG. 2 in the means for guiding fracture energy that are used to rupture the second rupturable plate 48. Only this difference will be described.

In FIG. 4, a tube member 310 is used as the means for guiding fracture energy. No holes are provided on the side face of the tube member 310 itself, but pressurized gas also exists in the interior of the tube member 310, and hence the interior of the tube member 310 is maintained at an equal pressure to the interior of the inflator housing 20.

The tube member 310 comprises a stepped portion 311 provided in the vicinity of the ignition means chamber 30, and a flange portion 312 provided at an opening portion on the ignition means chamber 30 side. The flange portion 312 abuts against the ignition means chamber housing 32 and inflator housing 20. A box-shaped booster housing 320 is disposed on the ignition means chamber 30 side of the tube member 310.

The booster housing 320 comprises a single opening portion 321 in a wall facing the first rupturable plate 38, and a plurality of vent holes 322 in a wall opposing the wall in which the opening portion 321 is provided. The opening portion 321 is set to be the same size as or larger than the first rupturable plate 38 (excluding the part that is welded to the ignition means chamber housing 32) so that the first rupturable plate 38 ruptures easily, and is sealed by a sealing member. The vent holes 322 are not sealed, and therefore the internal pressure of the booster housing 320 is equal to the internal pressure of the inflator housing 20.

A required amount of a solid booster 323 is charged into the booster housing 320. The solid booster 323 is set to be larger than the diameter of the vent holes 322 so that it does not fly out through the vent holes 322.

The solid booster 323 amplifies the fracture energy generated upon activation of the igniter 36, and is charged in an amount which ensures that the second rupturable plate 38 is ruptured reliably but the temperature of the pressurized gas is not raised.

Next, an operation of the inflator 300 shown in FIG. 4 will be described. When the first rupturable plate 38 is ruptured upon activation of the igniter 36, the resultant fracture energy flows into the booster housing 320 through the opening portion 321, thereby igniting and burning the solid booster 323 such that the fracture energy is amplified.

The amplified fracture energy passes through the tube member 310 and is discharged from the outlet on the opposite side to rupture the second rupturable plate 48. Due to the action of the guide member 50 at this time, the fracture energy impinges on the second rupturable plate 48 reliably.

The pressurized gas charged at high pressure into the interior space 22 then flows into the diffuser portion 40 and is discharged through the gas discharge holes 46 to inflate the air bag.

The igniter 36 is provided at only one end portion of the inflator 300, and the gas discharge holes 46 are provided on the opposite side of the igniter 36. Therefore, when attaching the air bag to the gas discharge holes 46, the lead wire connecting the igniter 36 to the power source (battery) does not obstruct the operation.

The inflator 300 comprising the booster housing 320 is better suited to a long inflator housing 20 than the inflators of the first through third embodiments, but even with an inflator having such a long inflator housing 20, the second rupturable plate 48 can be ruptured reliably while suppressing increases in the pressurized gas temperature. Therefore, pressure reductions due to volume shrinkage in the gas that is discharged into the air bag can be suppressed, and sufficient pressure can be maintained to ensure passenger safety (more specifically, the air bag can be maintained in an inflated state for five seconds or more).

When the inflator of each embodiment of the present invention is applied as an inflator for use in a side air bag, the air bag and inflator are disposed inside the vehicle seat, for example, and the gas discharge holes of the inflator are connected to an introduction pipe (or introduction port of the air bag) extending from the air bag. Meanwhile, when applied as an inflator for use in a curtain air bag, the inflator is disposed on the side face of the vehicle (the A pillar, B pillar, C pillar, or near the ceiling above the window on the side face of the vehicle), and the gas discharge holes of the inflator are connected to the introduction port (or introduction pipe) of the curtain air bag.

This invention thus described, it will be obvious that the same may be varied in many ways. Such variations are not to be regarded as a departure from the spirit and scope of the invention, and all such modification as would be obvious to one skilled in the art are intended to be included within the scope of the following claims.

The invention claimed is:

1. An inflator, comprising:
   a cylindrical inflator housing for storing a pressurized gas therein;
   an ignition means chamber housing defining therein an ignition means chamber and including therein an igniter, the ignition means chamber housing being connected to one end of the cylindrical inflator housing such that the ignition means chamber housing and the cylindrical inflator housing communicate with each other through a first through-hole;
   a first rupturable plate sealing the first through-hole before activation of the inflator, the first rupturable plate being adapted to be ruptured by the igniter;
   a diffuser portion provided with a gas discharge hole and being connected to the other end of the cylindrical inflator housing such that the diffuser portion and the cylindrical inflator housing communicate with each other through a second through-hole;
   a second rupturable plate sealing the second through-hole before activation of the inflator; and
   means provided within the cylindrical inflator housing and guiding fracture energy from the first rupturable plate to the second rupturable plate such that the first rupturable plate is ruptured initially and the second rupturable plate is ruptured latterly, the means for guiding fracture energy including, in a first end thereof, a flange portion that abuts against the ignition means chamber housing and an inner surface of the cylindrical inflator housing.

2. The inflator as claimed in claim 1, further comprising:
   a support member for supporting the means for guiding the fracture energy is disposed in the cylindrical inflator housing on a second rupturable plate side.

3. The inflator as claimed in claim 2, wherein the support member has fan-shaped space for allowing pressurized gas to pass therethrough.

4. The inflator as claimed in claim 2, wherein the support member includes an annular portion and a plurality of support portions extending inwardly in a radial direction of the support member, each support portion has an open end that defines a space for supporting the means for guiding the fracture energy.

5. The inflator as claimed in claim 1, wherein the means for guiding the fracture energy includes a projectile provided within the cylindrical inflator housing such that an arrowhead of the projectile opposes the second rupturable plate and a gap is provided between the arrowhead and the second rupturable plate.

6. The inflator as claimed in claim 5, wherein the means for guiding the fracture energy further includes a tube having the flange portion that is formed in a second end opposite to the first end such that the arrowhead is positioned outside the tube.

7. An inflator, comprising:
   a cylindrical inflator housing for storing a pressurized gas therein;
   an ignition means chamber housing defining therein an ignition means chamber and including therein an igniter, the ignition means chamber housing being connected to one end of the cylindrical inflator housing such that the ignition means chamber housing and the cylindrical inflator housing communicate with each other through a first through-hole;
   a first rupturable plate sealing the first through-hole before activation of the inflator, the first rupturable plate being adapted to be ruptured by the igniter;
   a diffuser portion provided with a gas discharge hole and being connected to the other end of the cylindrical inflator housing such that the diffuser portion and the cylindrical inflator housing communicate with each other through a second through-hole;
   a second rupturable plate sealing the second through-hole before activation of the inflator; and
   means provided within the cylindrical inflator housing and guiding fracture energy from the first rupturable plate to the second rupturable plate such that the first rupturable plate is ruptured initially and the second rupturable plate is ruptured latterly,
   wherein the means for guiding fracture energy comprises a tube member, a first end of the tube member is disposed in contact with the first rupturable plate or in the vicinity of the first rupturable plate, and a second end, opposite to the first end, of the tube member is disposed in contact with the second rupturable plate or in the vicinity of the second rupturable plate, and
   wherein the tube member serving as the means for guiding fracture energy decreases in diameter from the first rupturable plate side to the second rupturable plate side.

8. The inflator as claimed in claim 7, wherein the means for guiding the fracture energy comprise a combination of the tube member and an projectile member, and the projectile member is inserted into the tube member on the second rupturable plate side.

9. The inflator as claimed in claim 8, wherein a stopper is provided on an end portion of the tube member on the second rupturable plate side to prevent the projectile member from flying out of the tube member.

10. The inflator as claimed in claim 7, wherein the tube member has a flange portion extending outwardly in a radial direction from a first rupturable plate side of the tube member, the flange portion makes contact with an inner surface of the cylindrical inflator housing.

11. The inflator as claimed in claim 7, wherein the tube member is provided with vent holes formed in a peripheral wall at a vicinity of both end portions of the tube member.

12. The inflator as claimed in claim 7, wherein a cylindrical protrusion extends from the ignition means chamber in a longitudinal direction of the cylindrical inflator housing, a diameter of the cylindrical protrusion being smaller than a diameter of the tube member at the first end.

* * * * *